United States Patent [19]

Dixon et al.

[11] Patent Number: 4,611,965
[45] Date of Patent: Sep. 16, 1986

[54] GRAVITY-FEED GRAIN SPREADER

[76] Inventors: Carl R. Dixon, Rte. 2, Box 24A, Weiner; Jackie R. Anschultz, Box 213, Fisher, both of Ark. 72427

[21] Appl. No.: 626,541

[22] Filed: Jun. 29, 1984

[51] Int. Cl.⁴ .............................................. B65G 65/32
[52] U.S. Cl. ...................................... 414/299; 239/689
[58] Field of Search ........................ 414/293, 299–301; 239/193, 689

[56] References Cited

U.S. PATENT DOCUMENTS 3,698,574 10/1972 Louks ............................. 414/301 X
4,437,613 3/1984 Olson ............................. 414/301 X

FOREIGN PATENT DOCUMENTS 13057 of 1912 United Kingdom ................ 414/293

Primary Examiner—Joseph E. Valenza
Assistant Examiner—David A. Bucci
Attorney, Agent, or Firm—Walker & McKenzie

[57] ABSTRACT

A gravity-feed grain spreader for being positioned within a grain bin beneath the inlet opening thereof. The grain spreader includes a first hopper for initially receiving grain being introduced into the grain bin through the inlet opening therein, a second hopper for receiving grain from the first hopper, and a plurality of chutes extending outwardly and downwardly from the second hopper in a spider-like manner for directing grain from the second hopper substantially evenly about the interior of the grain bin.

7 Claims, 4 Drawing Figures

GRAVITY-FEED GRAIN SPREADER

BACKGROUND OF THE INVENTION

1. Field of the Invention

The present invention relates to a gravity feed grain spreader used in conjunction with a grain bin to evenly distribute grain within the grain bin.

2. Description of the Prior Art

Heretofore, various means have been developed for use in distributing grain and the like within bins. See, for example, Ebersole, U.S. Pat. No. 1,778,588; Snow, U.S. Pat. No. 2,655,273; Wurdeman, U.S. Pat. No. 4,040,529; McKenzie, U.S. Pat. No. 4,138,021; and Curry, U.S. Pat. No. 4,347,922. The Wurdeman patent discloses a grain spreader having a hopper disposed beneath an opening in the upper end of a grain bin and having slides disposed beneath and receiving grain from the hopper, the slides extending downwardly and outwardly from the hopper so that grain flowing therefrom can be distributed around the inside of the bin as the grain is deflected from the slides by deflectors spaced along with sides, the hopper having fins mounted therein at angles with respect to the vertical such that grain hitting the fins will cause the hopper and slides to rotate together. None of the above patents disclose or suggest the present invention.

SUMMARY OF THE INVENTION

The present invention is directed toward providing an improved grain spreader for evenly distributing grain within a grain bin. The concept of the present invention is to position a first hopper means beneath the inlet opening in the roof structure of a grain bin for initially receiving grain being introduced into the interior of the grain bin through the inlet opening; positioning a second hopper means beneath the first hopper means for receiving grain from the first hopper means; and positioning a plurality of channel means relative to the second hopper means for receiving grain from the second hopper means and for directing the grain received from the second hopper means outward therefrom.

DESCRIPTION OF THE PREFERRED EMBODIMENT

Figure 1:
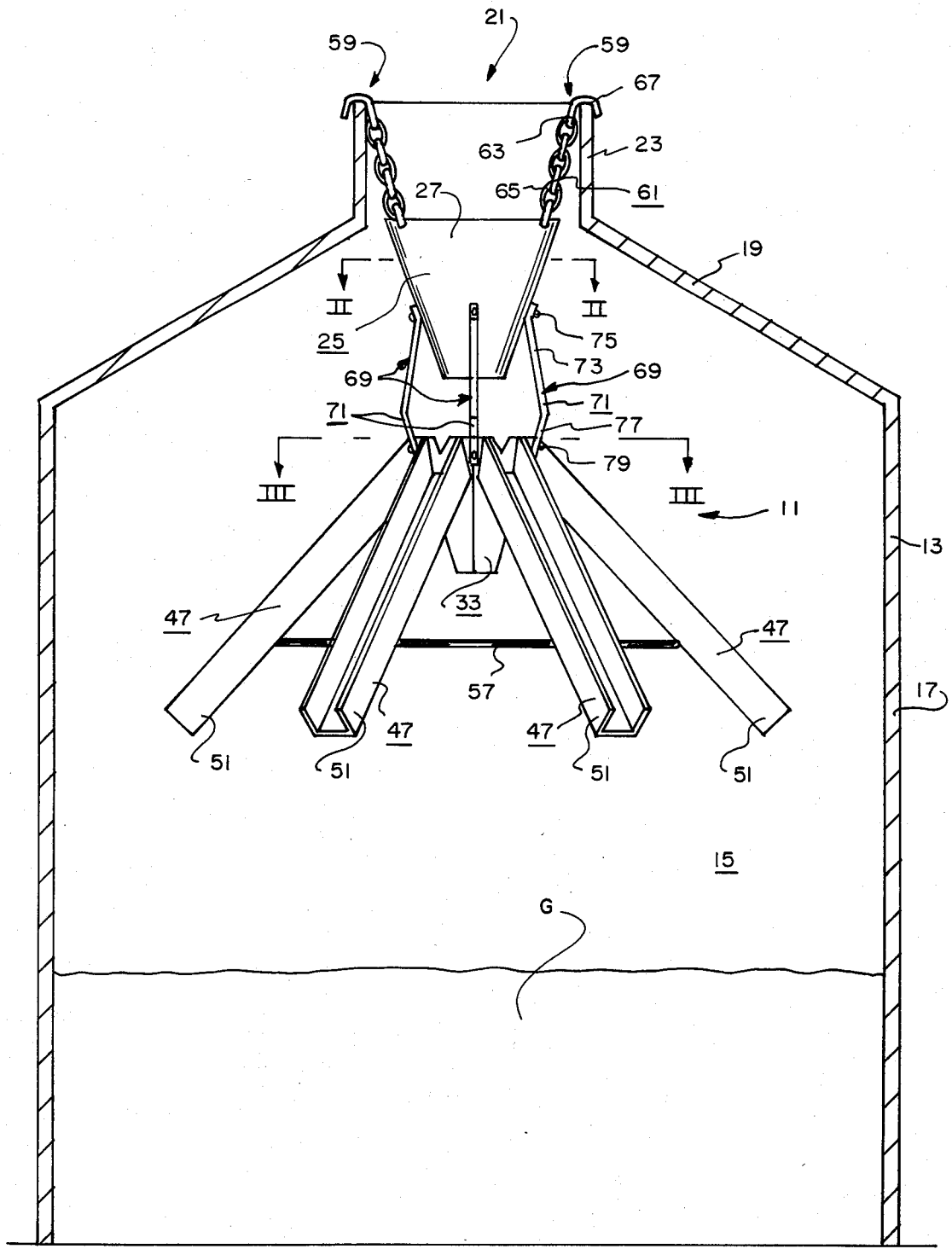
FIG. 1 is a side elevational view of the gravity feed grain spreader of the present invention, shown mounted within a grain bin, portions of the grain bin being broken away for clarity.

The gravity grain spreader 11 of the present invention is for use with a grain bin 13 for allowing grain G to be introduced into the interior 15 of the grain bin 13. The grain bin 13 may be of any typical construction having wall structure 17 and a roof structure 19 to define the interior 15. Thus, for example, the grain bin 13 may be constructed of metal with the wall structure 17 having a substantially cylindrical shape and with the roof structure 19 having a substantially conical shape covering the upper end of the cylindrical wall structure 17. The roof structure 19 is provided with an inlet opening 21 for allowing grain to be introduced into the interior 15 of the grain bin 13 therethrough. A cylindrical collar 23 may be provided about the inlet opening 21. A lid or the like (not shown) may be used to close the inlet opening 21 in the typical manner when desired.

Figure 2:
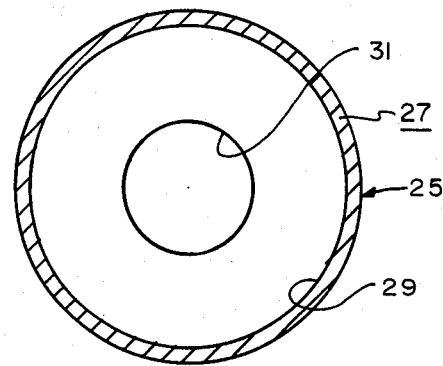
FIG. 2 is an enlarged sectional view substantially as taken on line II—II of FIG. 1 with portions thereof omitted for clarity.
Figure 4:
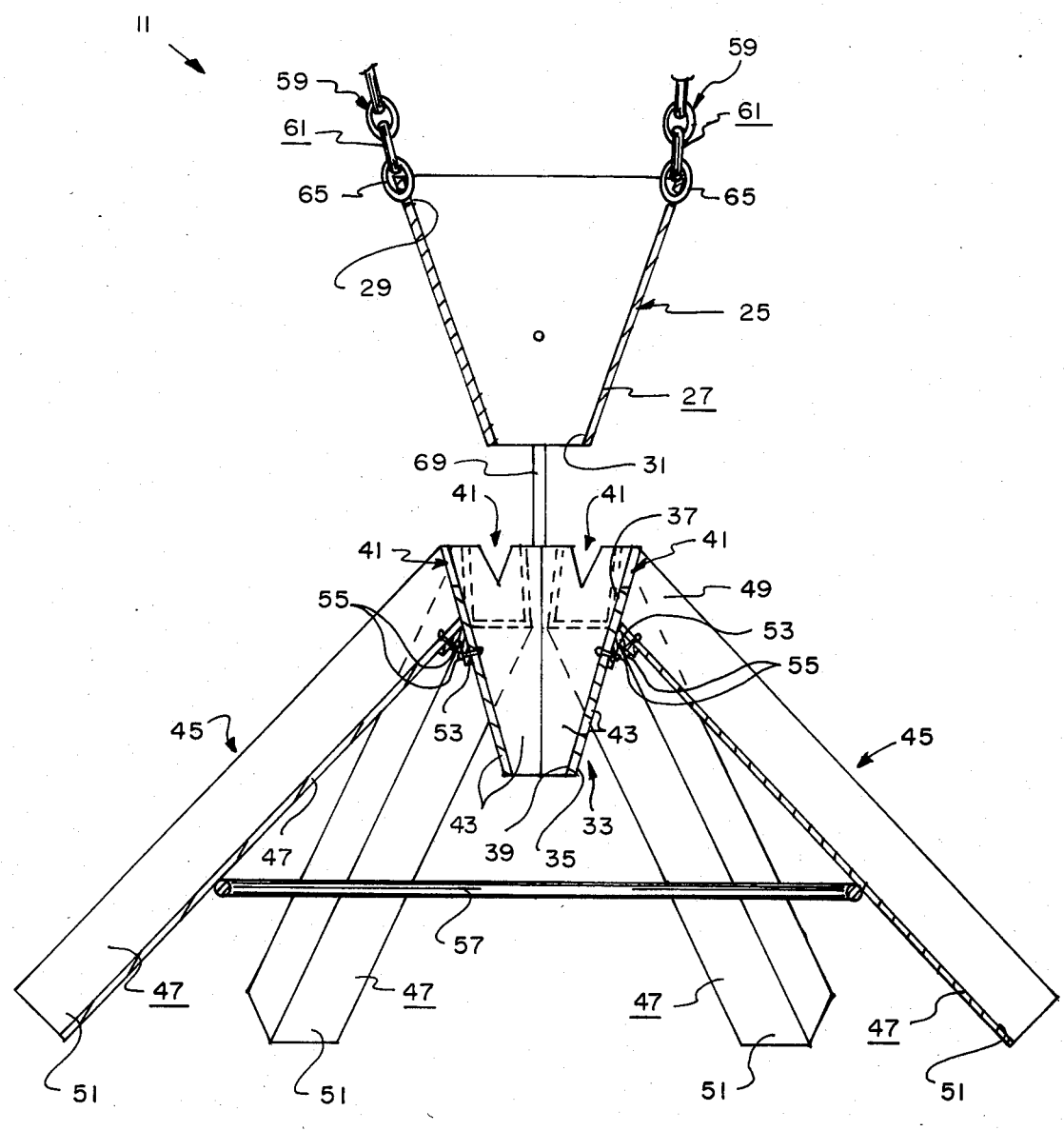
FIG. 4 is an enlarged sectional view substantially as taken on line IV—IV of FIG. 3 with portions thereof omitted for clarity.

The grain spreader 11 includes a first hopper means 25 for being positioned beneath the inlet opening 21 in the roof structure 19 of the grain bin 13 as clearly shown in FIG. 1 for initially receiving grain G being introduced into the interior 15 of the grain bin 13 through the inlet opening 21. The first hopper means 25 may include a funnel member 27 having a relatively large upper or inlet opening 29 and a relatively small lower or outlet opening 31 (see, in general, FIGS. 2 and 4). The funnel member 27 may be constructed of any substantially rigid material in any manner apparent to those skilled in the art. Thus, for example, the funnel member 27 may be molded or cast out of a substantially rigid metal such as aluminum or the like.

Figure 3:
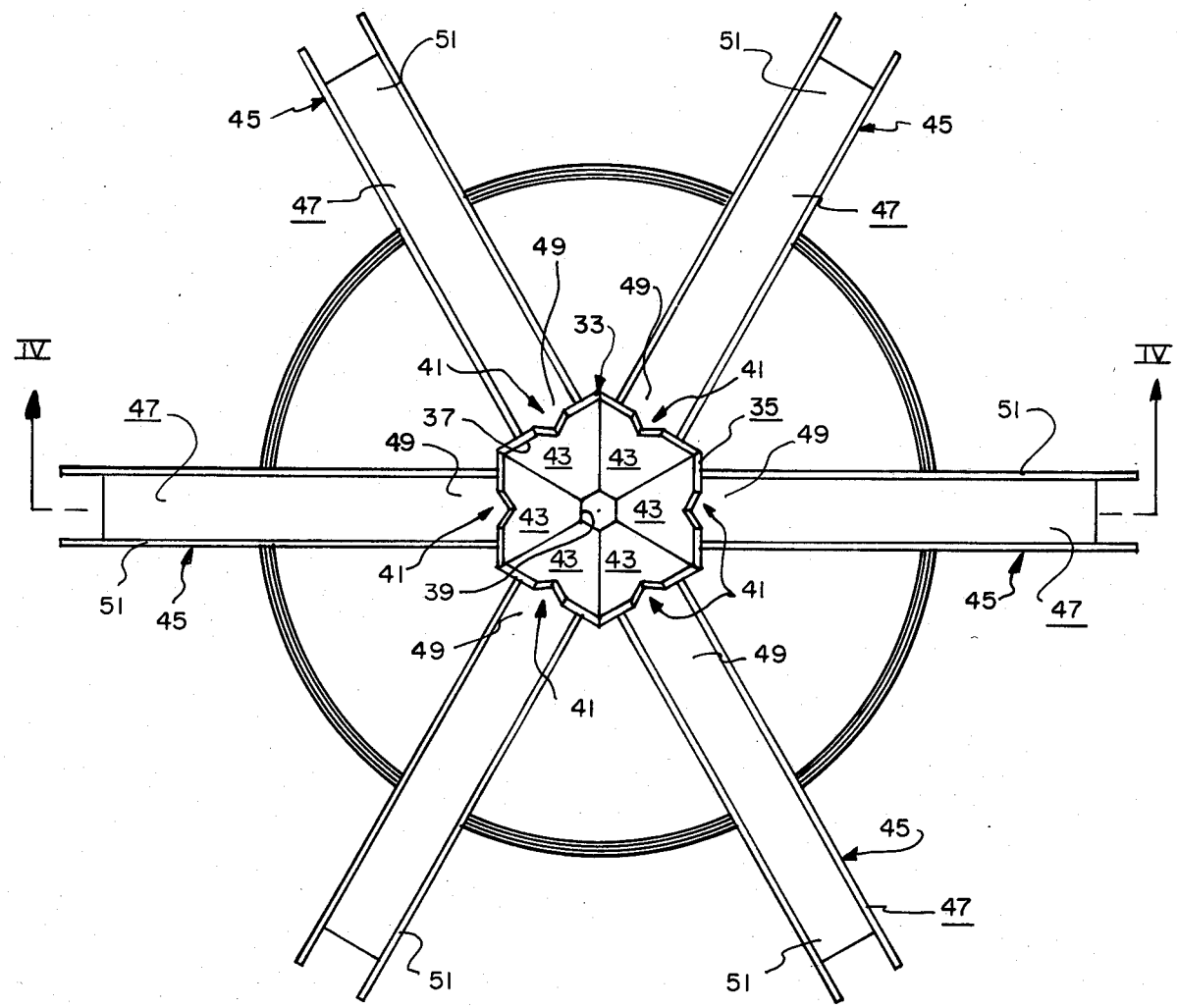
FIG. 3 is an enlarged sectional view substantially as taken on line III—III of FIG. 1 with portions thereof omitted for clarity.

The grain spreader 11 includes a second hopper means 33 for being positioned beneath the first hopper means 25 as clearly shown in FIG. 1 for receiving grain from the first hopper means 25. Thus, the second hopper means 33 is positioned substantially directly beneath the outlet opening 31 of the funnel member 27 of the first hopper means 25 to receive grain G passing through the outlet opening 31. The second hopper means 33 preferably includes a funnel member 35 having a relatively large upper or inlet opening 37 and a relatively small lower or outlet opening 39 (see, in general, FIGS. 3 and 4). The sides of the funnel member 35 have a plurality of passageways 41 therethrough for allowing grain to exit the funnel member 35 in a manner and for reasons which will hereinafter become apparent. The passageways 41 may consist merely of notches or the like formed in the upper rim of the funnel member 35 adjacent the inlet opening 37. The funnel member 35 may have a plurality of substantially flat side members 43 whereby the funnel member 35 will be substantially hexagonal shaped when viewed from the top as shown in FIG. 3. Each side member 43 is preferably provided with one passageway 41 substantially centered in its upper edge. The funnel member 35 may be constructed of any substantially rigid material in any manner apparent to those skilled in the art. Thus, for example, the funnel member 35 may be cast or molded from a metal such as aluminum or the like.

The grain spreader 11 includes a plurality of channel means 45 for receiving grain from the second hopper means 33 and for directing the grain received from the second hopper means 33 outward therefrom. Each channel means 45 preferably includes an elongated chute 47 extending outwardly and downwardly from each passageway 41 in the funnel member 35. The chutes 47 preferably have a substantially U-shaped cross section to form a trough or the like to convey the grain away from the second hopper means 33. Thus, each chute 47 has a first end 49 for being attached to the funnel member 37 of the second hopper means 33 adjacent a passageway 41 and has a second end 51 remote therefrom. The chutes 47 may be constructed of any substantially rigid material in any manner apparent to those skilled in the art. Thus, for example, the chutes 47 may be cast or molded from a metal such as aluminum. The first end 49 of each chute 47 may be attached to the funnel member 35 in any manner apparent to those skilled in the art such as, for example, by way of a connector plate 53 secured by bolt means 55 or the like to the funnel member 35 and the chute 47. Brace members 57 may extend between the chutes 47 intermediate the first and second ends 49, 51 thereof for providing more support and rigidity to the chutes 47.

The grain spreader 11 preferably includes a first attachment means 59 for attaching the first hopper means 25 to the roof structure 19 of the grain bin 13 adjacent the inlet opening 21. The first attachment means 59 may include a plurality of flexible elongated members 61 such as chains or the like having a first end 63 fixedly attached to the funnel member 27 adjacent the inlet opening 29 thereof and having a second end 65, and a hook member 67 fixedly attached to the second end 65 of each elongated members 61 for being hooked over the top edge of the cylindrical collar 23 of the grain bin 13 to thereby securely position the first hopper means 25 within the grain bin 13 directly below the inlet opening 21 thereof.

The grain spreader 11 preferably includes a second attachment means 69 for attaching the second hopper means 33 to the first hopper means 25. The second attachment means 69 preferably includes a plurality of elongated rod members 71 or the like for extending between the first and second hopper means 25, 33. Each rod member 71 preferably has a first end 73 for being fixedly attached to the funnel member 27 of the first hopper means 25 in any manner apparent to those skilled in the art such as by way of bolt means 75, and has a second end 77 for being fixedly attached to the funnel member 35 of the second hopper means 33 in any manner apparent to those skilled in the art such as by way of bolt means 79.

To use the grain spreader 11, it is first positioned within a grain bin 13 in any manner apparent to those skilled in the art with the first attachment means 59 being used to position the first hopper means 25 directly below the inlet opening 21 in the roof structure 19 of the grain bin 13. When grain G is introduced into the interior 15 of the grain bin 13 through the inlet opening 21 in the roof structure 19 thereof in any conventional manner, substantially all of the grain G will pass into the first hopper means 25. Gravity will then cause the grain G to flow out through the outlet opening 31 and into the second hopper means 33. Because of the relatively small opening 39, the second hopper means will cushion the flow of grain therethrough and grain G will typically build up in the second hopper means 33. When the grain builds up to a level equal with the passageways 41, it will flow through the passageways 41 to the chutes 47. Gravity will then cause the grain G to slide along the chutes 47 outward from the second hopper means 33 toward the wall structure 17 of the grain bin 13, causing the grain G to be substantially equally distributed within the interior 15 of the grain bin 13.

The size of the first and second hopper means 25, 33 and channel means 45, the number of channel means 45, and the angles of the walls of the funnel members 27, 35 and the chutes 47 may vary depending on the type and volume of grain G being introduced, the size of grain bin 13, etc. The grain spreader 11 can be designed to handle any grain G amount from one bushel per hour up.

Although the present invention has been described and illustrated with respect to a preferred embodiment thereof and a preferred use therefore, it is not to be so limited since changes and modifications can be made therein which are within the full intended scope of the invention.

I claim:

1. A gravity-feed grain spreader for use with a grain bin including roof structure having an inlet opening for allowing grain to be introduced into the interior of the grain bin, said grain spreader comprising:
    (a) a first hopper means positioned beneath the inlet opening in the roof structure of the grain bin for initially receiving grain being introduced into the interior of the grain bin through the inlet opening; said first hopper means including a funnel member having a relatively large inlet opening and a relatively small outlet opening;
    (b) a second hopper means positioned beneath said first hopper means for receiving grain from said first hopper means; said second hopper means including a funnel member having an upper end with a relatively large inlet opening therein and having a relatively small outlet opening;
    (c) a plurality of channel means attached to said upper end of said funnel member of said second hopper means for receiving grain from said second hopper means after the grain substantially fills said funnel member of said second hopper means and starts to overflow into said channel means and for directing the grain received from said second hopper means outward from said second hopper means, each of said channel means extending outwardly and downwardly from said funnel member of said second hopper means;
    (d) a first attachment means attaching said funnel member of said first hopper means relative to the roof structure of the grain bin; and
    (e) a second attachment means attaching said funnel member of said second hopper means relative to said funnel member of said first hopper means.

2. The grain spreader of claim 1 in which said funnel member of said second hopper means has a plurality of passageways therethrough, and in which each of said channel means is positioned adjacent one of said passageways.

3. The grain spreader of claim 2 in which the interior of said funnel member of said second hopper means is formed by a plurality of flat surfaces.

4. The grain spreader of claim 3 in which said passageways through said funnel member of said second hopper means are located on the top edge of said funnel member.

5. The grain spreader of claim 4 in which each of said channel means includes an elongated chute having a substantially U-shaped cross section.

6. The grain spreader of claim 5 in which said first attachment means includes a plurality of flexible elongated members, each of said elongated members having a first end for being attached to said funnel member of said first hopper means and having a second end; and in which said first attachment means includes a plurality of hook members for being attached to said second ends of said elongated members and for hooking onto the roof structure of the grain bin.

7. The grain spreader of claim 6 in which said second attachment means includes a plurality of rigid rod members, each of said rod members having a first end for being attached to said funnel member of said first hopper means and having a second end for being attached to said funnel member of said second hopper means.

* * * * *